June 4, 1968  V. C. REES  3,387,115
PROGRAMMING APPARATUS
Filed Oct. 14, 1965  4 Sheets-Sheet 1
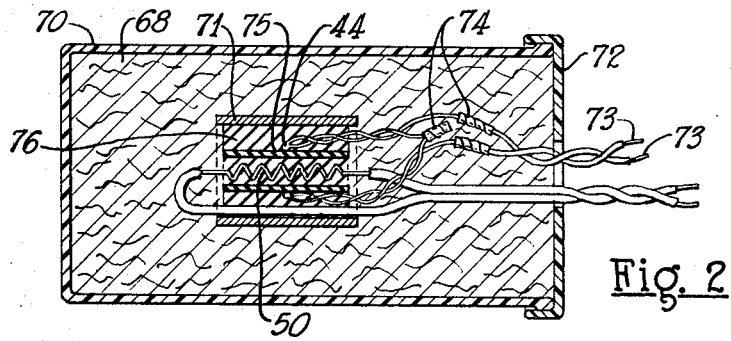
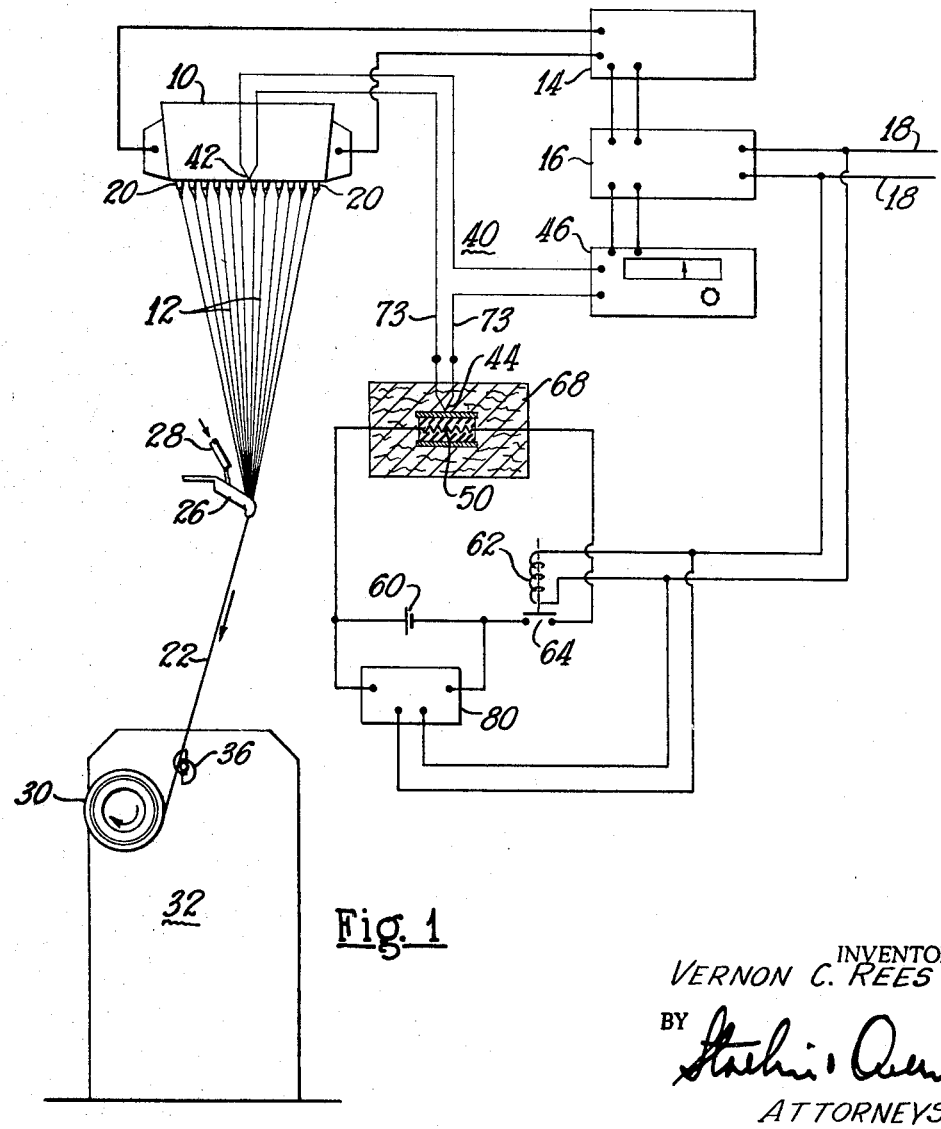
INVENTOR
VERNON C. REES
BY
ATTORNEYS June 4, 1968 V. C. REES 3,387,115
PROGRAMMING APPARATUS
Filed Oct. 14, 1965 4 Sheets-Sheet 2

INVENTOR
VERNON C. REES
BY
ATTORNEYS

INVENTOR.
VERNON C. REES
BY
Staelin & Overman
ATTORNEYS

3,387,115
PROGRAMMING APPARATUS
Vernon C. Rees, Newark, Ohio, assignor to Owens-Corning Fiberglas Corporation, a corporation of Delaware
Continuation-in-part of application Ser. No. 293,994, July 10, 1963. This application Oct. 14, 1965, Ser. No. 496,094
12 Claims. (Cl. 219—504)

ABSTRACT OF THE DISCLOSURE

Programming apparatus in which electrical signals are converted to heat which is accumulated or stored. Heat sensitive apparatus provides electrical output signals in response to the amount of heat so accumulated or stored to provide long term programming signals.

---

The present invention relates to programming apparatus in general and, in particular, to thermal programmers and time responsive integrating units. This application is a continuation-in-part of my co-pending application Ser. No. 293,994, filed July 10, 1963, now abandoned and entitled, Programming Apparatus, now U.S. Patent 3,227,858, issued Jan. 4, 1966.

With the continual expansion of automated controls for system operation, emphasis is constantly being placed on component reliability. This has resulted in the refinement of saturable reactors and other known control components and in the development of new control components such as the semiconductor family. Both the reactor and the semiconductor components' reliability is enhanced since there are no moving parts. This development to the present has concentrated on the component capable of providing a quick, complete response to an input signal. There has been a need for a control component which is able to provide a prolonged output signal with varying characteristics in magnitude, shape, or recovery time as desired and which is very reliable. This reliability has again been attained in the present invention instance by the development of a device having no moving parts. Further there has been a need for apparatus for providing an output signal proportional to the number of events occurring and the time spacing of such occurrences.

In the manufacture of silicon or siliceous fibers or filaments, such as glass fibers and the like, the glass to be formed is maintained in a molten state in electrically energized or heated containers referred to as bushings. These bushings are typically energized to maintain the molten glass at a constant temperature in the order of approximately 2300° F. during the fiber forming operations. Usually the manufacturing operation continues on a twenty-four hour a day basis. Oftentimes the electric power supply for energizing the bushing is cut off due to generating equipment failure or transmission line failure cause by accumulation of snow on the power lines, electrical storms, explosions, and other unforeseen circumstances. These power failures may last for periods of minutes to several hours, but generally the power is returned on an average within a period of an hour.

During the time that the power supply is cut off, the bushings gradually fall in temperature along an exponential decay curve from the operating temperature to ambient temperature.

In the manufacture of glass fibers or other heat sofenable materials for textile strands and the like there are the above-described inevitable times when the electrical power supplied to the textile bushing fails, resulting in loss of temperature in the textile bushing, and there are other times when the textile bushing is purposely shut down for cleaning of associated auxiliary equipment or other maintenance. During these time the textile bushing temperature falls from the operating temperature of the bushing. When power is again applied to the textile bushing, it is of paramount importance that the power be applied at such a rate as to avoid current surges damaging to the bushing while raising the temperature to operating range with a minimum loss of time. This requires a control component capable of producing a prolonged output signal.

In another application a prolonged output signal with a desired varying characteristic may be required in a traffic control system. Still other applications for the programmer of this invention are in the field of generating signal waves with certain desired characteristics and having very long wavelengths. A component has also been needed to integrate simultaneous or successive signals with a provision to take into account the time spacing of the signals or the time since the last signal. Such components are useful in elevator systems for integrating calls from various floors being served by an elevator system and changing the system operation in accordance with the time-integration of such calls. Further, the component may be used in programming the time-sharing of a telephone system or of a single computer serving a number of control loops.

Accordingly, it is an object of this invention to provide an impoved control component or programmer.

It is another object of this invention to provide a reliable control component or programmer capable of sustained or prolonged outputs of varying characteristics.

A further object of this invention is to provide a reliable thermal control component or programmer responsive to electrical input signals and providing sustained electrical output signals.

One embodiment of the control component or programmer of this invention includes a heat accumulator device consisting of a resistor, a heat storage device and associated heat insulation so selected that upon de-energization the temperature of the heat accumulator diminishes exponentially and substantially gradually over a desired period. A thermocouple is associated with the resistor and the heat storage device to sense the temperature and provide a signal in response thereto. A power means or input signal means is selectively connected to cause the resistor to be heated. The heat storage device or heat sink will store the heat or energy from the resistor. The thermocouple may be used to provide an electrical output during the heat storage time and/or to provide an electrical output after the heating of the resistor has ceased. This and other embodiments will be described in more detail hereinafter.

It is thus a further object of the invention to provide programming means to store information of electrically operating loads, and to use the information stored to effect changes in operation.

In another embodiment, the invention features two heat sensors connected in additive relationship, one disposed in thermal sensing relationship with an electrically operated load or heat generator while the other is disposed in thermal sensing relationship with a heat accumulating desistance. The other or second heat sensor may then establish a signal in the one or first heat sensor as the temperature of the heat accumulating resistance is raised by supply of power from a separate power source. The time characteristic of such an accumulator is dependent upon the physical design of the resistance, its mass, and its wattage per square inch of heat dissipation. The total time characteristic of the accumulator is also dependent upon the kind, amount, and placement of insulation, and is also dependent on the kind, mass and position of the heat sink associated with the resistance being heated.

In a still further embodiment or application the invention herein is utilized as a time responsive integrating unit and comprises a heat sink means for accumulating heat, means for applying heat to the heat sink means in response to signals proportional to changes being measured external to the unit, and thermoelectric means disposed in heat sensing relationship with and responsive to the heat sink means for providing an electrical output signal proportional to the heat accumulated in the heat sink. The heat sink is advantageously isolated or insulated from ambient temperatures to hold the heat longer for a more sustained output signal. The heat applying means may be a resistance means connected to and responsive to receive and totalize a plurality of successive or simultaneous electrical input signals by dissipating heat to the heat sink in proportion to the inputs received. The thermoelectric means may be a thermocouple means responsive to and operative to generate a signal in proportion to heat accumulated in the heat sink. The thermoelectric means may also be an element having a resistance variable in response to heat and an electrical output circuit connected to the variable resistance element and controlled thereby.

Other objects, features and advantages of this invention will become apparent when the following description is taken in conjunction with the accompanying drawings, in which:

FIG. 1 is a schematic circuit diagram of an electrical system which may be controlled by a programmer according to this invention;

FIG. 2 shows an illustrative arrangement of one embodiment of the programmer apparatus of this invention;

Figure 8:
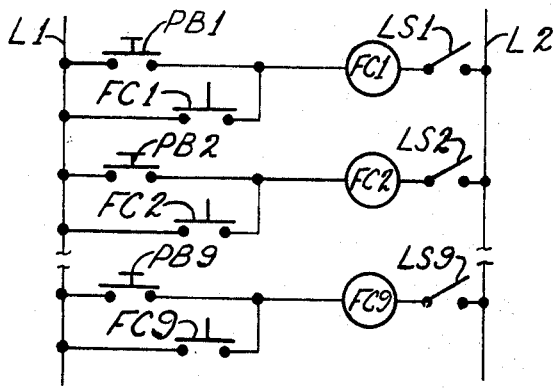
Figure 9:
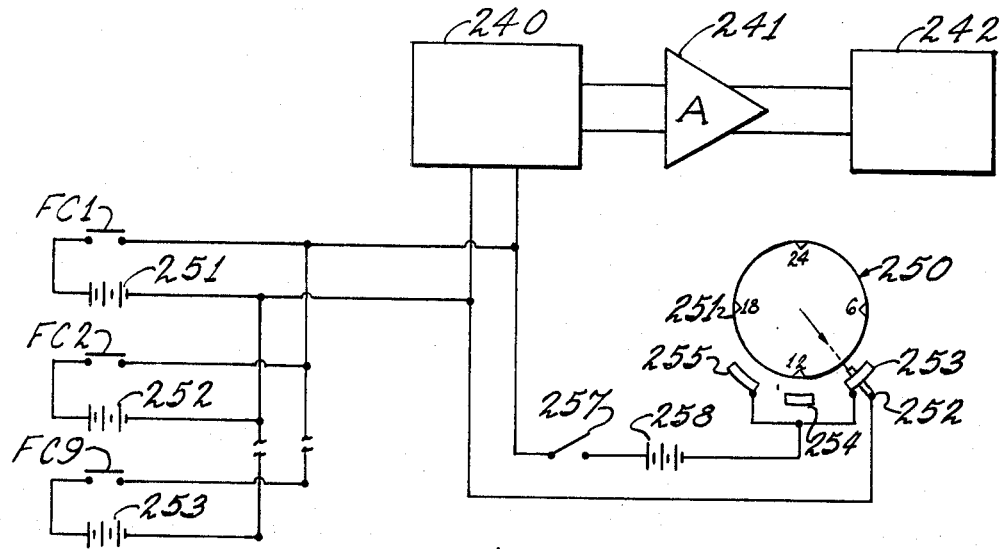
Figure 10:
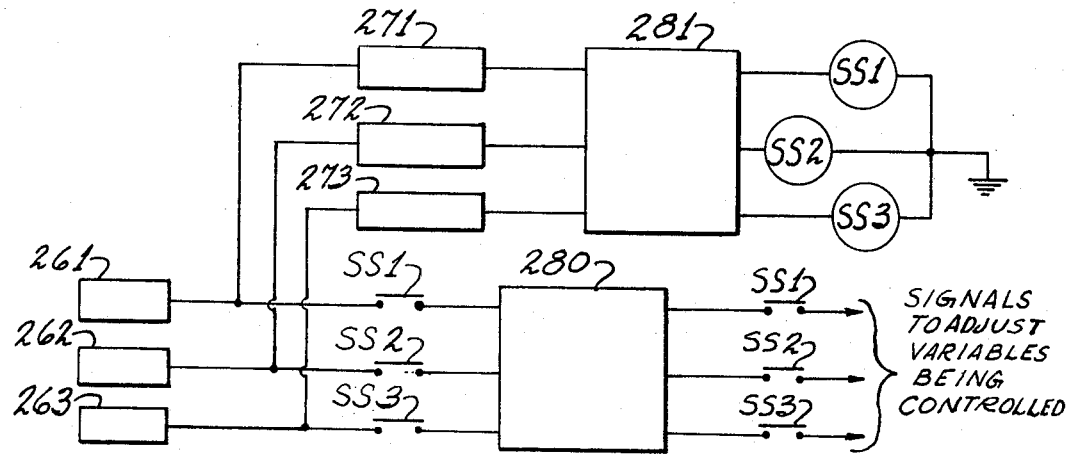
Figure 11:
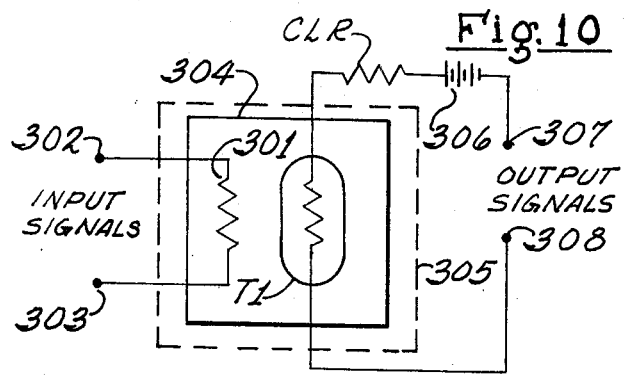

FIGS. 8 and 9 schematically illustrate an elevator system controlled by a time responsive integrating unit of this invention;

FIG. 10 schematically illustrates a system for time-sharing a computer or other controller in accordance with the teachings of this invention; and FIG. 11 is a schematic illustration of another embodiment of the integrating unit of this invention.

Referring now to FIG. 1, there is shown a molten glass container, textile bushing or feeder 10 for forming textile fibers 12 from molten glass. The molten glass may be maintained at a normal operating temperature of about 2300° F. The operating temperature is maintained within the desired range by direct passage through the feeder 10 of electrical current supplied from a transformer 14 which is energized in response to control of a saturable core reactor 16 connected to power supply terminals 18. Other suitable control means such as a silicon controlled rectifier may be used to control power supplied.

The textile fibers 12 are formed of the molten glass fed through orifices 20 in the bottom of the feeder 10. The fibers 12 are gathered together into a strand 22 by passage of the fibers over a gathering member 26 in a manner well known in the art. The fibers are supplied with sizing fluid at the gathering member 26 from a supply tube 28 communicating with a source of sizing fluid in a known manner, but not shown here. The successively formed portions of the strand 22 are wound upon a package 30 by a winder unit 32 as the strand 22 is caused to traverse the package 30 by a spiral wire-type traverse mechanism 36.

The feeder 10 receives glass marbles which are heated into molten form by the secondary single loop winding of the transformer 14. The heating current for the feeder 10 is derived from alternating current supplied to the terminals 18, for example, from a 440 volt, 60 cycle source, not shown.

A programming system 40 includes an electrical circuit with at least two heat sensors or thermocouples 42, 44 in series with a temperature controller 46 for maintaining the temperature of the feeder 10. The thermocouple 42 senses the temperature of the feeder while the thermocouple 44 senses the temperature at the heat sink 71 of a heat accumulator which includes a storage or programming resistor 50.

Figure 3:
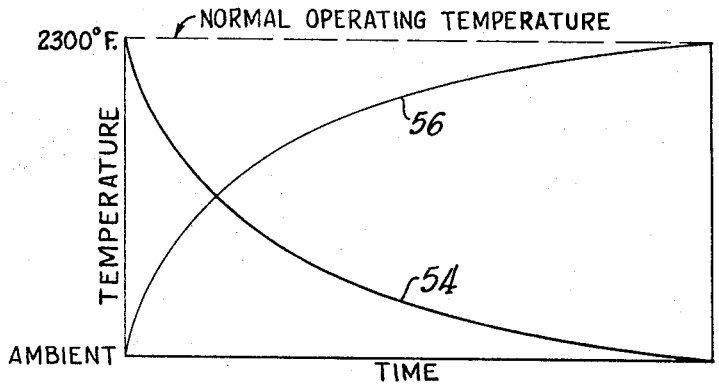
FIG. 3 is a temperature-time chart showing the characteristic curves of the electrically heated load of the system in FIG. 1 and of the programmer in FIG. 2.

Referring to FIG. 3, the temperature-time characteristic curve 54 of the feeder 10 as the temperature of the feeder decreases due to power failure or temporary shut-down of the feeder for fin cleaning or the like is sensed by the thermocouple 42. The temperature-time characteristic curves 56 of the programming resistor 50 and/or heat sink 71 as the temperature increases due to current supplied thereto from a battery 60, such as a Burgess 1.25 v. battery, is complementary or inverse with respect to the curve 54, as shown in FIG. 3.

As is apparent from the circuit arrangement of the programming system 40, the resistor 50 is energized when the power supply at terminals 18 fails or is shut down, since deenergization of relay 62 allows contacts 64 to close to complete circuit 50, 60, 64.

The programming resistor 50 is imbedded in an insulating material 68 such as glass fiber and the mass of insulation with the imbedded resistor 50 and thermocouple 44 is encased in a housing 70. The temperature-time characteristics of the assembly are such that upon de-energization of the resistor 50, which occurs when power is again applied to terminals 18 resulting in energization of the relay 62 to open the contacts 64, the heat of the resistor 50 as sensed by thermocouple 44 diminishes exponentially gradually over a period of time logarithmically proportional to the period of time that the resistor 50 was energized. Thermocouple 44 therefore provides a signal additively combined with the signal derived in the feeder thermocouple 42 whereby a combined or control temperature signal is provided in controller 46 for regulating the magnitude of power that the saturable core reactor 16 will allow the transformer 14 to supply to the feeder 10 and the rate at which the temperature of the feeder 10 may be raised during the re-energization of the feeder while the programming resistor is decreasing in temperature.

When generally complementary curves 54, 56 are provided, the series arrangement of thermocouples 42, 44 causes controller 46 to receive a substantially constant signal with a consequent supply of constant power to the terminals 18 during the startup period of the feeder. Accordingly, the current flow through the feeder which would otherwise be a surge, will be restrained to a substantially constant value during startup, thereby eliminating the need for tedious and randomly inaccurate manual regulation of the feeder.

Instead of a surge of current being directed through the feeder 10 as called for by thermocouple 42 sensing a cold feeder, the programmer provides a complementary prolonged or sustained control signal in thermocouple 44 so that the feeder temperature appears apparently higher than it actually is in regulating the saturable core reactor 16. Accordingly, the controller 46 restrains the current flow in the saturable core reactor from the terminals 18 to the feeder 10, while the temperature of the feeder is being continually built up. Correspondingly, the feeder thermocouple 42 gradually develops an increased controlling signal as the influence of the resistor or programmer thermocouple diminishes.

The housing 70 in FIG. 2 may be generally configured to resemble what is known as a pill box having a closure 72 that completes the enclosure of the imbedded resistor 50 and the thermocouple 44. A copper tube 71 is provided as a heat sink to store the heat or energy dissipated by the resistor. Other devices may be used for heat storage, for example, iron pipe fittings. The heat storage device is an important factor in determining the time-temperature curve of the programmer.

All the connections for the thermocouple to lead wires 73 may be soft solder heater wire connections which subsequent to forming the connections are wrapped with strips of tape 74. A tape 75 which is advantageously heat resistant may be interposed between the resistor 50 and the thermocouple 44, and additional wrapping of preferably heat resistant tape 76 may be applied to cover the thermocouple and fill the tube 71 as shown in FIG. 2.

It is possible within the scope of the invention to provide one or more additional thermocouples that may be connected in parallel or series, as desired, to provide other time-temperature characteristics that may be desired.

Figure 4:
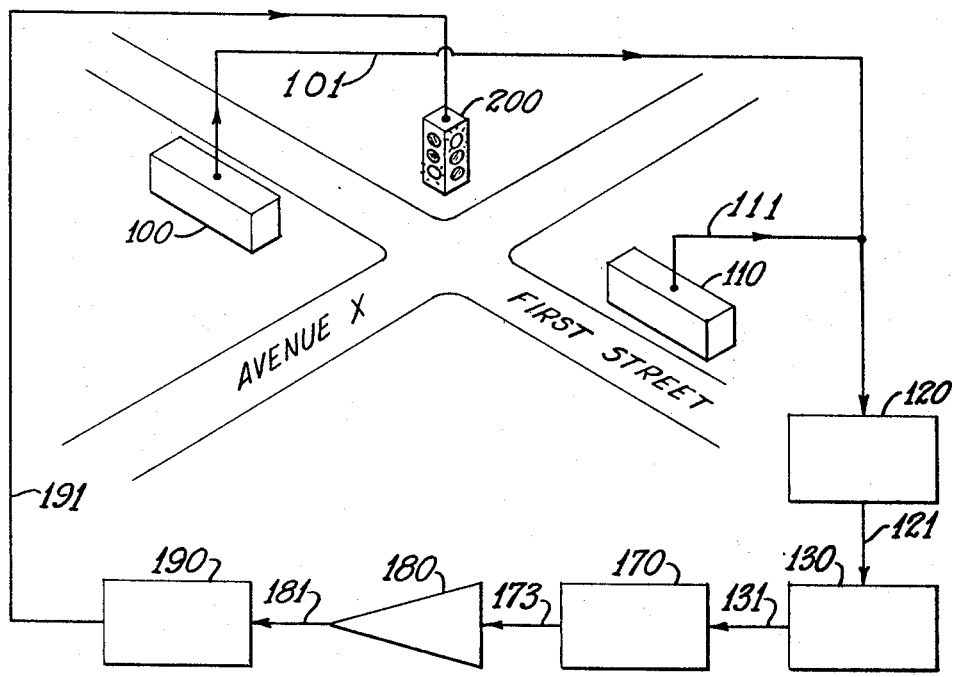
FIG. 4 is a schematic diagram of a traffic control system which may be controlled by a programmer according to this invention.
Figure 5:
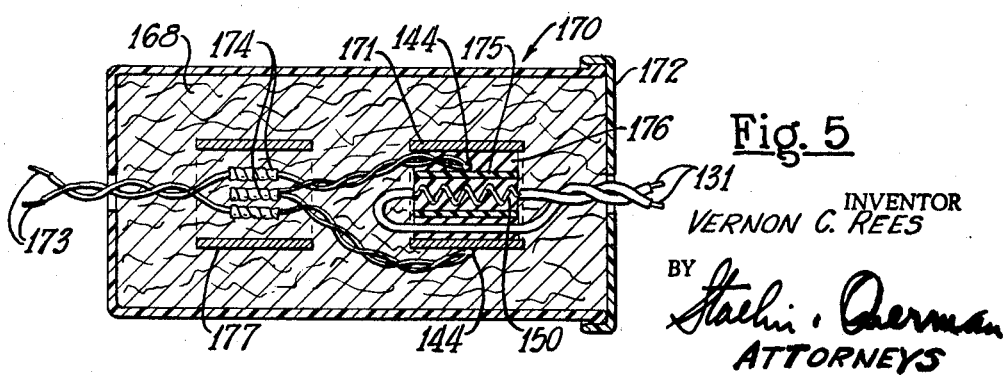
FIG. 5 shows an illustrative arrangement of a second embodiment of the programmer apparatus of this invention, which embodiment may be used in the system shown in FIG. 4.

Referring to FIGS. 4 and 5 there is shown in FIG. 4 a traffic control system, and in FIG. 5 a second embodiment of a programmer according to this invention and suitable for use in the system of FIG. 4.

In the schematic traffic control circuit of FIG. 4 there is shown an intersection of two streets, Avenue X and First Street. The traffic flow on the two streets is controlled by a signal light system 200. Detectors 100 and 110 are placed along First Street, for example, half way down the block from the intersection of First Street and Avenue X to sense the traffic flow along First Street. In response to traffic flow the detectors 100 and 110 send signals along connections 101 and 111, which are proportional to the traffic flow, to a power control unit 120. The signals sent along leads 101 and 111 may be proportional in amplitude of voltage or current or in the frequency of pulses. There are several mechanisms that are suitable for use as detectors such as the traffic counters operated by air pressure and having an air hose stretched across the street, the photo-sensitive detectors which are operated by the breaking of a light beam directed across the street, etc.

The power control unit 120 via connection 121 controls a power supply unit 130. The power supply unit 130 provides a signal to the input of programmer 170 via connection 131 proportional to traffic flow along First Street and of sufficient power to energize a resistor 150 for heating within programmer 170. Programmer 170 provides an output via connection 173 to an amplifier 180. The amplifier 180 amplifies the signal from programmer 170 and, via connection 181, provides a signal to a signal light control unit 190. The unit 190 controls the indicator lights 200 via connection 191 in a manner well known in the art.

In one embodiment of the schematic traffic control circuit of FIG. 4 the signal lights may always be maintained "on" or "green" for the same amount of time for Avenue X. Depending upon the signal received from programmer 170 the signal lights may allow traffic flow from First Street through the intersection for the same amount of time as that flowing from Avenue X. As traffic increases along First Street detectors 100 and 110 sense the traffic increase, increase the signal from programmer 170, and thus increase the amount of time the signal light stays "on" or "green" to allow traffic flow from First Street across Avenue X.

The programming resistor 150, as shown in FIG. 5, is imbedded in an insulating material 168, such as glass fiber, and the mass of insulation 168 with the imbedded resistor 150 and the thermocouple means 144 is encased in a housing 170. The temperature-time characteristics of the assembly are such that upon deenergization of the resistor 150, in response to a lack of input power or signal from power supply unit 130, the temperature of the resistor 150 as sensed by the thermocouple 144 diminishes exponentially gradually over a period of time proportional to the period of time that the resistor 150 was energized. That is, the resistor 150 has an operating curve similar to that shown by the curve 56 in FIG. 3. When resistor 150 is heated the temperature of resistor 150 rises in accordance with the curve 56 in FIG. 3 as long as the resistor 150 receives power from the detection and power control.

A copper tube, or other suitable fitting, is provided as a heat sink to store the heat or energy dissipated by the resistor 150. When the resistor 150 is no longer energized the temperature-time characteristic curve 56 of the programming resistor 150 and/or heat sink 171 diminishes exponentially gradually over a period of time proportional to the period of time that the resistor 150 was energized. Thus the programmer 170 will continue to supply a signal for a period of time to the traffic control 190 to allow the signaling system 200 to continue to direct traffic through the intersection from First Street until a predetermined lower level of traffic has been reached. Once the signal from programmer 170 falls below a predetermined magnitude the signal light control 190 will then cause the signaling system 200 to direct traffic along Avenue X through the intersection.

Again, all of the connections for the thermocouple to output lead wires 173 may be soft solder heater wire connections which subsequent to forming the connections are wrapped with strips of tape 174. A tape 175 which is advantageously heat resistant may be interposed between the resistor 150 and the thermocouple 144, and additional wrapping of heat resistant tape 176 may be applied to cover the thermocouple and fill the tube or heat sink 171.

The programmer of FIG. 5 is distinguished from the programmer shown in FIG. 2 by the addition of a second heat sink 177 around and in thermal disposition with the cold junctions covered by the tape 174 of the thermocouple 144. The second heat sink 177 is of substantially the same mass as first-mentioned heat sink 171. This compensates for ambient temperature variations, since the change in ambient temperature must change the temperatures of the equal masses by the same amount. If the second heat sink is not utilized ambient temperature fluctuations may change the cold junctions temperature more rapidly than the temperature of the hot junctions at 144 since the normal millivoltage output of the programmer varies as the difference of the temperatures of the hot junctions and the temperatures of the cold junctions.

Figure 6:
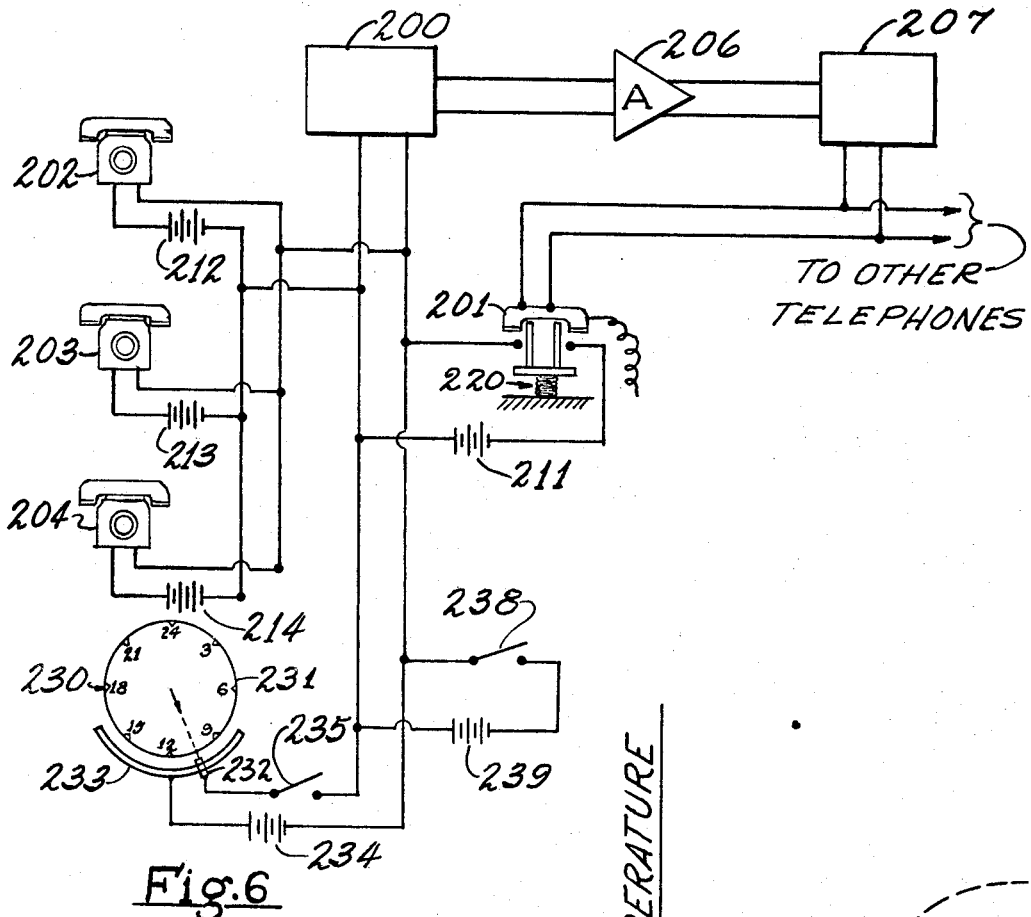
FIG. 6 is a schematic diagram of a telephone time-control system which may be controlled by a time responsive integrating unit of this invention.

Referring to FIG. 6 there is illustrated a telephone system which may be controlled by the programmer or integrating unit of this invention. There are phone systems in use today, particularly internal systems in larger business organizations, wherein telephone calls may be made directly without going through the city exchanges that would normally be involved. In order to insure that the best use is made of such internal systems many have signal means, such as a buzzer to note the end of a specified period of use, e.g. three minutes. The buzzer will either override the conversation or will be a signal prior to automatic cutoff at the end of the specified period. Such systems cannot determine whether that particular line is really needed for another call or not, but arbitrarily interrupts at the end of the period.

In FIG. 6 there is illustrated a system for overcoming these difficulties. Assume that a plurality of phones 201, 202, 203, 204, are connected to share the same speech carrying line. Switching means, such as designated generally at 220, may be arranged to provide an input signal from a battery or other voltage source 211 when a call is made. If no other calls were attempted on this same line then the input signal and the programmer 200 could be designed to allow a longer time period to elapse, e.g. six minutes, before an output from programmer 200 through amplifier 205 would be of a magnitude to initiate action by the buzzer control system 207, thereby terminating the call from phone 201. That is, the heat accumulated in programmer or integrating unit 201 would reach a predetermined level in response to the electrical input signal from battery 211 and switching means 220 to provide the desired output.

If calls were attempted by dialing any of the phones 202, 203, 204, switching means responsive to the dialing would be operative to provide an additional input to the programmer 200. This would cause the predetermined level of heat accumulated in the programmer 200 to be reached more quickly and in turn activate buzzer control system 207 more quickly, reducing the time of the call that may be made from phone 201.

The buzzer control system 207 may be set to provide a lower limit of time, e.g. three minutes, no matter how many other calls are attempted from the remaining plurality of phones on the line. However, the programmer would continue to accumulate heat in response to the calls attempted and, since the heat is dissipated from the heat sink exponentially over a period of time, would continue to regulate the length of the calls in response to the traffic on the phone line.

Figure 7:
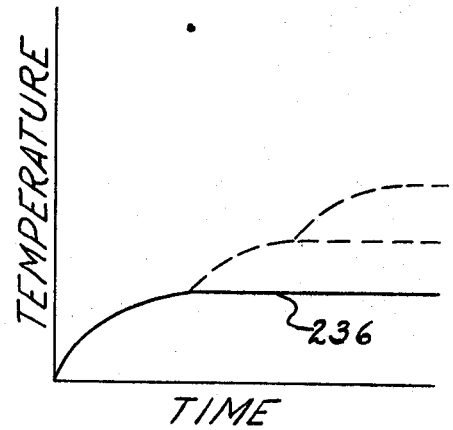
FIG. 7 is a temperature-time chart showing characteristic curves of the integrating unit utilized in FIG. 6.

The range of design dimensions of the programmer 200 allows the use of many refinements. Various biasing means may be utilized. Clock timing means 230 may be used to bias the programmer 200 for a specified length of time during a selected period. That is, a 24 hour clock 231 may have its drive mechanism connected to close a circuit between a movable contact 232 and a stationary bar-type contact 233, for example, between the normal business hours of 8:00 a.m. and 5:00 p.m., or, on the 24 hour clock, 0800 hours and 1700 hours. The closure of contacts 232 and 233 would provide a signal from source 234 through disabling switching means 235 to the programmer 200. This would provide a base or bias level input of heat to the accumulator or sink per the curve 236 illustrated in the temperature-time graph of FIG. 7. The curves shown in dotted lines represent other inputs to the programmer 200, which would build the accumulated heat to the level necessary to initiate the desired action. The switching means 235 may be utilized to disable the clock biasing input on days that are not regular work days or this may be done automatically.

Similarly, a bias may be applied at will via a switch 235 and source 239 to effect other changes. It should be noted that a bias may be applied after the programmer 200 or the amplifier 206 if it is desired to accomplish an instantaneous bias that can be switched "on" or "off" without effecting the heat build up and thus also the heat dissipation in the programmer 200. Such a biasing means could be the simple switch 236 and source 239 network shown, connected before or after the amplifier 206.

Referring to FIGS. 8 and 9 there is shown an elevator system that may be controlled by a programmer 240. In FIG. 8 there is illustrated circuitry for registering floor calls for a plurality of floors. Push buttons PB1, PB2, . . . PB9, when pushed, close a circuit between power leads L1 and L2 through their respective floor call relays FC1, FC2, . . . FC9. Contacts FC1, FC2, . . . FC9 then close a circuit around the push buttons PB1, PB2, . . . PB9, to provide a holding circuit for the floor call relays FC1, FC2, . . . FC9, until the calls are answered. Limit switches LS1, LS2, . . . LS9, are operative to be mechanically, electrically, or magnetically opened, as by a car door opening, when a car stops at a floor to answer a call. The holding circuit at the floor where the call is answered is thus broken and the circuit is ready to register a new call when a passenger wishes to use the elevator.

Although the floor call relays have many other contacts serving other purposes in a standard elevator system there is shown in FIG. 9 one contact of each relay FC1, FC2, . . . FC9, which are used to provide a signal from sources 251, 252, 253, respectively, to the programmer 240. As is well known in the art the number of calls registered and the length of time the calls have been registered constitutes information that is most useful in automatically determining the mode of operation of an elevator system. That is, a bank of elevator cars may be zoned in their operation, overdue calls may be answered first, individual cars that are temporarily parked may be put into operation again, etc. through the operation modes that are most suitable for the traffic pattern of a particular building being served by the system. For this particular example the programmer has been used to integrate the number and length of time of registration of the calls to, for example, bring into operation "off-duty" cars that have been put into a stand-by or "off" parking status because of low traffic demand. In response to inputs from the sources 251, 252, 253, the programmer 240 will accumulate more and more heat to provide a larger output which may be used to bring one or more additional cars back into operation.

Since the heat accumulated does not dissipate instantaneously the programmer 240 also serves to hold the "extra" cars in operation for a while after the predetermined level has been reached so that new calls may be answered speedily. Further, as the magnitude of the output from the programmer 240 drops the cars may be retired to their "off-duty" status in the reverse order and timing to that of their activation.

As discussed hereinbefore, biasing means may be utilized. Clock timing means 250 may be used to bias the programmer for anticipated rush hours, as at the beginning and end of a working day and during a lunch hour. A 24 hour clock 251 may have its drive mechanism connected to close a circuit between a movable contact 252 and a series of stationary contacts 253, 254, and 255 positioned to cover peak traffic hours 0800 to 1000 hours, 1200 to 1300 hours and 1600 to 1800 hours. Closure of the movable contact 252 with any of the stationary contacts 253, 254, or 255 would provide a bias signal for programmer 240 from source 256 via disabling switching means 257 and would thus activate "off-duty" cars. The switching means 257 could be utilized to disable the biasing means on the week-ends when not needed. Additional selective biasing may be utilized for other purposes.

Referring to FIG. 10 there is illustrated schematically a system for time-sharing a master programmer or a computer or other control apparatus. A plurality of sensors 261, 262, and 263 are connected to measure changes in conditions being controlled. These conditions may be inputs to a process, calls registered in an elevator system, etc. The magnitude, number of occurrences, and time of each occurrence will be translated into heat accumulation within programmers or integrating units 271, 272 and 273, as received from sensors 261, 262, and 263, respectively.

The outputs of programmers or integrating units 271, 272, 273, are compared by comparison circuits 281. Such comparison circuits can be set to choose the highest, lowest, or closest to a predetermined value from the outputs of programmers 271, 272, and 273, and energize one of the corresponding relays SS1, SS2, SS3. Energization of a relay closes corresponding SS contacts on each side of the computer, master programmer or control apparatus 280. When used with a computer this may select a loop or channel in a process for immediate computation of an adjustment signal for a variable in the process. If the programmer is part of an elevator system a car may be selected and sent to a floor where a call has been registered for an abnormal length of time because the floor has been bypassed with express cars, cars already completely loaded, etc. With control apparatus generally a particular mode of operation may be selected or a readout may be made.

Referring to FIG. 11 there is illustrated another embodiment of a thermal programmer 300. A resistance or other means 301 and a thermoelectric element T1 are placed in thermal disposition with respect to a heat sink or accumulator means 304. The heat sink means 304 is advantageously thermally isolated or insulated from ambient temperatures by insulating means 305. Input signals to the programmer or integrating unit are applied to heating means 301 via input terminals 302, 303.

The thermoelectric element T1 is an element having a resistance that varies substantially in response to heat, preferably one that has an inverse ratio. That is, as the heat applied rises, the resistance of the element decreases. A thermistor is a suitable element for use in this application. An electrical output circuit is to be connected in circuit with the element T1 to provide the desired output signal. Although only a single circuit including a source 306 and a current limiting resistor CLR is shown in FIG. 11 to provide an output to terminals 307, 308, it is to be noted that the element T1 may be utilized to control more sophisticated output circuitry such as solid state amplifying circuits.

The embodiment shown in FIG. 11 may be preferable in applications where an output of substantial magnitude is required. The embodiments shown in FIGURES 2 and 5 may be preferred where smaller output signals are suitable since the thermocouples utilized in those embodiments constitute self-sufficient signal generating means requiring no additional power pack.

In operation the apparatus of FIG. 11 is adapted to accumulate heat in sink 304 in response to input signals received at terminals 302, 303. The thermoelectric means, including element T1 and the output circuit of source 306 and resistance CLR is operative to provide an output signal at terminals 307 and 308 proportional to the heat accumulated in sink 104.

There has thus been described a thermal programmer or time responsive integrating unit which is capable of providing a sustained or prolonged output signal long after the input signal has ceased. It is obvious that the characteristics, magnitude and shape of the output signal may be changed by utilizing additive combinations of thermoelectric sensing devices and varying their relative dispositions with respect to the device being heated by the input signals. Further, varying the mass and disposition of the heat sinks will affect the output signal.

In conclusion, it is pointed out that while the illustrated examples constitute practical embodiments of my invention, I do not limit myself to the exact details shown since modification may be made without departing from the spirit and scope of this invention.

I claim:

1. A time responsive control unit comprising heat sink means for accumulating heat; means for insulating said accumulating means from ambient temperatures; means for applying heat to said accumulating means in response to signals proportional to conditions being measured external to said unit; and means disposed in heat sensing relationship with said accumulating means and insulated from ambient temperatures to be responsive only to said accumulating means for generating an electrical output signal proportional to the amount of heat accumulated therein.

2. A control unit as defined in claim 1 in which said heat applying means is a resistance means connected to and responsive to receive and totalize a plurality of electrical inputs by dissipating heat to said accumulating means in proportion to said input received.

3. A control unit as defined in claim 1 in which said generating means comprises thermocouple means responsive to and operative to generate a signal in proportion to heat accumulated in said accumulating means.

4. A control unit as defined in claim 1 which further includes means for biasing said heat accumulating means to a predetermined temperature level.

5. A control unit as defined in claim 2 which further includes means for applying an input bias signal to said resistance means.

6. A control unit as defined in claim 5 which further includes timing means and means responsive to said timing means for selectively connecting said bias signal to said resistance means.

7. Apparatus for providing an output signal proportional to the number of events occurring and the time-spacing of such occurrences comprising means for sensing each occurrence and the length of time of said occurrence and providing a signal proportional thereto, heat sink means for accumulating means responsive to said occurrence signals for heating said heat accumulating means, and means disposed in heat sensing relationship with said heat accumulating means for generating an electrical output signal proportional to the accumulated heat therein.

8. Apparatus as defined in claim 7 which includes a plurality of said means for providing an output signal proportional to the number of events occurring and the time-spacing of such occurrences, and which further includes means for comparing the magnitudes of said plurality of output signals to select a predetermined program.

9. A thermal programmer comprising a device adapted to be heated with electrical input signals, first means for storing the heat dissipated in response to said input signals, thermocouple means disposed in temperature sensing relationship with said first means, means for insulating said temperature sensing disposition of said thermocouple means from ambient temperatures, said thermocouple means having cold junctions, a second means of substantially the same mass as said first-mentioned means disposed within said insulating means and in thermal relationship with said cold junctions of said thermocouple means thereby providing compensation for ambient temperature changes external of said insulating means, and output signal connections for said thermocouple means.

10. A thermal programmer comprising a heat accumulator including insulating material having a device imbedded therein adapted to be heated with electrical input signals, first means imbedded in said insulating material and substantially surrounding said device to be heated to store the heat dissipated from said device, thermocouple means disposed in said accumulator in temperature sensing relationship with said device to be heated and said first imbedded means, ambient temperature compensating means comprising second means imbedded in said insulating material of substantially the same mass as said first imbedded means and disposed in thermal relationship with cold junctions of said thermocouple means, said thermocouple means providing an electrical output signal proportional in magnitude to the heat present in said accumulator.

11. A thermal programmer as defined in claim 10 in which said device to be heated includes an electrical resistance.

12. A thermal programmer as defined in claim 11 in which said imbedded means are formed from metal tubes.

References Cited
UNITED STATES PATENTS

| | | | |
|---|---|---|---|
| 2,332,596 | 10/1943 | Pearson | 338—23 |
| 2,651,699 | 9/1953 | Jacobsen et al. | 338—22 |
| 2,915,724 | 12/1959 | Fritts | 338—23 |
| 2,966,646 | 12/1960 | Baasch | 338—23 |
| 3,028,473 | 4/1962 | Dyer et al. | 219—504 |
| 3,109,910 | 11/1963 | Fogleman | 219—505 |
| 3,227,797 | 1/1966 | Rees | 13—6 |
| 3,227,858 | 1/1966 | Rees | 219—494 |

OTHER REFERENCES

Analogue Computation, McGraw-Hill, vol. 3, Fifer 1961, pp. 656–659.

RICHARD M. WOOD, *Primary Examiner.*

L. H. BENDER, *Assistant Examiner.*